United States Patent
Laird et al.

(10) Patent No.: US 9,926,952 B2
(45) Date of Patent: *Mar. 27, 2018

(54) CONDITIONER, APPARATUS AND METHOD

(71) Applicants: Christopher B. Laird, Erie, PA (US); Gregor Brown, Prestwick (GB)

(72) Inventors: Christopher B. Laird, Erie, PA (US); Gregor Brown, Prestwick (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/179,468

(22) Filed: Jun. 10, 2016

(65) Prior Publication Data

US 2016/0281751 A1    Sep. 29, 2016

Related U.S. Application Data

(63) Continuation of application No. 14/683,958, filed on Apr. 10, 2015, now Pat. No. 9,366,274, which is a continuation of application No. 13/734,705, filed on Jan. 4, 2013, now Pat. No. 9,003,895, which is a continuation of application No. 12/925,558, filed on Oct. 25, 2010, now Pat. No. 8,347,733.

(51) Int. Cl.
| | |
|---|---|
| *F15D 1/02* | (2006.01) |
| *G01F 1/66* | (2006.01) |
| *G01F 15/00* | (2006.01) |
| *F15D 1/00* | (2006.01) |
| *F15D 1/06* | (2006.01) |

(52) U.S. Cl.
CPC ............. *F15D 1/025* (2013.01); *F15D 1/001* (2013.01); *F15D 1/06* (2013.01); *G01F 1/662* (2013.01); *G01F 1/667* (2013.01); *G01F 15/00* (2013.01)

(58) Field of Classification Search
CPC .......... G01F 1/662; G01F 1/667; G01F 15/00; F15D 1/025
USPC ......................................... 73/861.28, 861.27
See application file for complete search history.

(56) References Cited

U.S. PATENT DOCUMENTS

| | | | |
|---|---|---|---|
| 3,620,506 A | 11/1971 | So | |
| 4,600,544 A | 7/1986 | Mix | |
| 6,394,644 B1 | 5/2002 | Streiff | |
| 6,604,850 B1 | 8/2003 | Schneider et al. | |
| 8,347,733 B2 * | 1/2013 | Laird ................... | B01F 5/0619 73/861.28 |
| 2002/0031046 A1 | 3/2002 | Schneider et al. | |
| 2008/0037366 A1 | 2/2008 | Smith | |
| 2009/0151472 A1 | 6/2009 | Brown et al. | |
| 2010/0218490 A1 | 9/2010 | Forster et al. | |
| 2012/0107324 A1 | 5/2012 | Eberlein et al. | |

* cited by examiner

*Primary Examiner* — Jewel V Thompson
(74) *Attorney, Agent, or Firm* — Ansel K. Schwartz

(57) ABSTRACT

A flow conditioner for displacing and mixing fluid flow to minimize the effects of thermal gradients on the accuracy of a transit time ultrasonic flowmeter having a first portion adapted to be disposed in the pipe and extending inward toward the center of the pipe in a downstream direction with respect to the fluid flow relative to the pipe's inner surface. The conditioner has a second portion adapted to be disposed in the pipe and in juxtaposition with the first portion. The second portion extending inward toward the center of the pipe in an upstream direction with respect to the fluid flow relative to the pipe's inner surface. An apparatus for determining fluid flow in a pipe having ultrasonic transducer sites. A method for determining fluid flow in a pipe. A method for affecting fluid flow in a pipe.

15 Claims, 14 Drawing Sheets

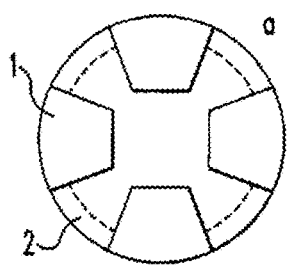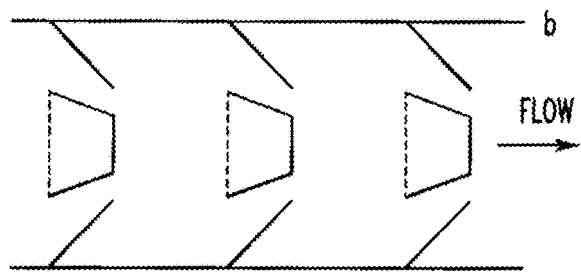
FIG.3A          FIG.3B
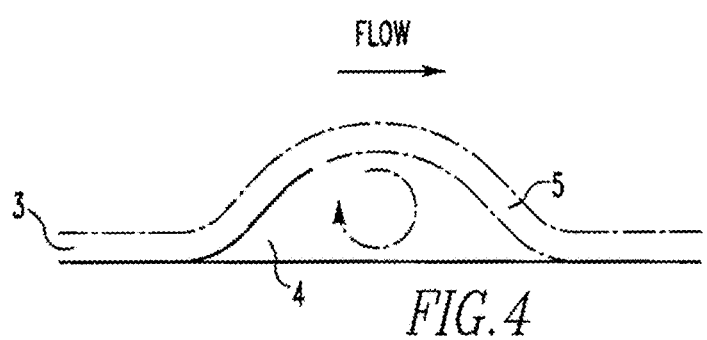
FIG.4

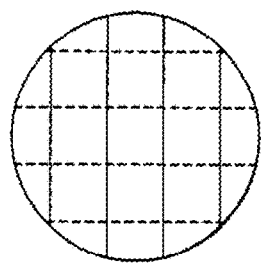
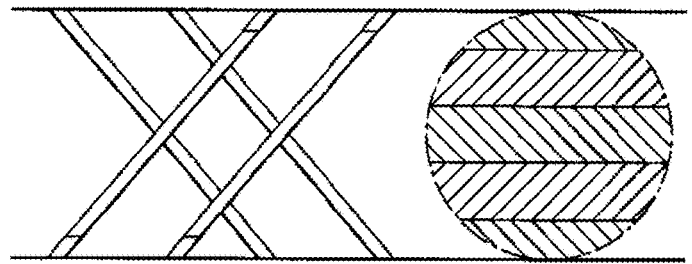
*FIG. 7A*  *FIG. 7B*
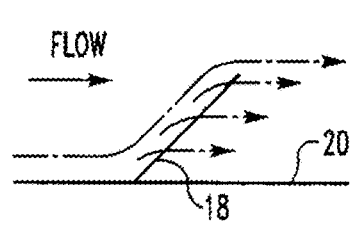
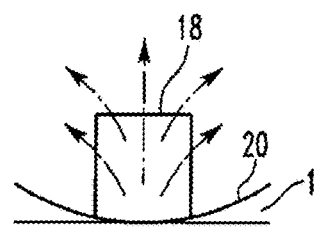
*FIG. 8A*  *FIG. 8C*
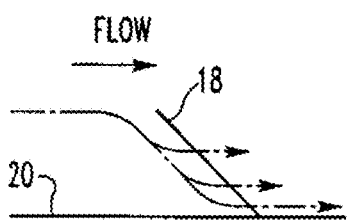
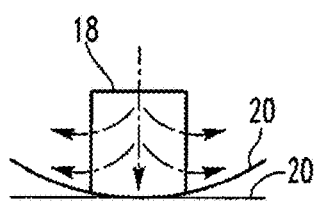
*FIG. 8B*  *FIG. 8D*

CONDITIONER, APPARATUS AND METHOD

CROSS-REFERENCE TO RELATED APPLICATIONS

This is a continuation of U.S. patent application Ser. No. 14/683,958 filed Apr. 10, 2015, now U.S. Pat. No. 9,366,274, which is a continuation of U.S. patent application Ser. No. 13/734,705 filed Jan. 4, 2013, now U.S. Pat. No. 9,003,895, which is a continuation of U.S. patent application Ser. No. 12/925,558 filed Oct. 25, 2010, now U.S. Pat. No. 8,347,733 issued Jan. 8, 2013, all of which are incorporated by reference herein.

FIELD OF THE INVENTION

The present invention is related to displacing and mixing a thermal boundary layer in fluid flowing in a pipe before a transducer site in the pipe in which a transducer of an ultrasonic flow meter is disposed. (As used herein, references to the "present invention" or "invention" relate to exemplary embodiments and not necessarily to every embodiment encompassed by the appended claims.) More specifically, the present invention is related to displacing and mixing a thermal boundary layer in a laminar fluid flow in a pipe before a transducer site in the pipe in which a transducer of an ultrasonic flow meter is disposed with a first ramp and at least a second ramp in juxtaposition with the first ramp.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Transit time ultrasonic flowmeters are capable of high accuracy performance over a wide range of application conditions. This has led to their adoption in applications such as custody transfer of liquid hydrocarbons. In the majority of applications, the combination of velocity, pipe diameter and viscosity are such that the flow is turbulent. Turbulent flow is characterized by the presence of turbulent vortices or 'eddies' that provide cross-stream mixing of the flow.

In some applications, such as the production and transportation of 'heavy oil', the fluid viscosity is greater than normal, with the result that the flow may be in the transitional or laminar regimes. Transitional flows typically occur in the region where Reynolds number is between 2,000 and 10,000. Laminar flows typically occur at Reynolds numbers below 2,000. In laminar conditions the flow essentially travels parallel to the axis of the conduit, with no cross-stream mixing. In the transitional flow regime the flow essentially switches back and forth between laminar and turbulent conditions.

When flow is in the laminar regime, the lack of turbulent mixing means that temperature gradients can form in the fluid. If, for example, the fluid flow entering a section of pipe is at a higher temperature than the pipe itself, then the fluid directly next to the pipe wall will be cooled to the temperature of the pipe wall, and a temperature gradient will develop between the wall and the centre of the pipe. The form of the temperature gradient will vary depending on factors such as the flow velocity, the temperature differential, the thermal conductivity of the fluid and distance along the conduit. Typically, in the applications of interest, the temperature will change rapidly in a region close to the pipe wall.

Transit time ultrasonic flowmeters operate by estimating flow velocity, and hence volumetric flowrate, by measuring the flight time of ultrasonic pulses. For applications that demand high accuracy, normally the ultrasonic transducers are installed in a housing that is integrated into a pipe spool such that the face of the housing is at an angle (typically 45°) to the pipe axis. A further aspect of flow meter design typical for high-accuracy applications, is that the transducer housing will not protrude beyond the inside wall of the conduit. As such a cavity is formed in front of the housing, and the ultrasound passes through the fluid in this cavity before traversing the cross-section of the conduit and passing through a second cavity in front of the receiving transducer. When the fluid between the faces of the two transducer housings is homogenous and isothermal, the ultrasound essentially travels in a straight path. However, when thermal gradients exist in laminar flow conditions, the fluid trapped in the cavities will take on the pipe wall temperature. As the velocity of sound is a function of temperature, the result is that the ultrasound must now undergo refraction as it travels from one transducer to the other. This means that instead of traveling along a path that is straight and constant, the path taken by the ultrasound is now a function of the process fluid, temperature and flow conditions.

Even in the case where the transducers are mounted external to the conduit, such as in so called clamp-on ultrasonic flowmeters, the presence of a thermal gradient will result in additional refraction of the ultrasonic path such that it will be different from assumptions applied in the flow meter's calculation algorithm.

Fluid flow meters are often deployed with some form of upstream flow conditioning device. In general these are deployed in order to remove non-axial components of flow velocity and/or to reshape the velocity profile across the pipe. Examples are tube bundles (FIG. 1a) and vane-type conditioners (FIG. 1b) which predominately aim to remove non-axial flow components by subdividing the flow into channels which are longer in the direction of the pipe axis than they are in cross-section, thus breaking up large vortices and increasing the tendency of the flow to travel parallel to the pipe axis.

Perforated plate flow conditioners are designed with the intent of both removing non-axial flows and reshaping the axial velocity profile. This is achieved by using perforations in a plate that divide the flow into a series of jets as illustrated in FIG. 2. The flow is redistributed as a result of the pressure differential across the plate and turbulent mixing of the jets downstream of the plate produces a flow velocity distribution that is essentially uniform and free of bulk non-axial flow components.

Tab-type flow conditioners such as the proprietary Vortab device, use tabs 1 to generate large vortices that mix the flow, destroying any bulk non-axial flow components that exist upstream and redistributing the axial velocity profile. These vortices then dissipate downstream so that the velocity field presented to the meter is improved relative to disturbed conditions that may exist upstream of the device. An example of a tab type conditioner is shown in FIGS. 3a and 3b.

None of these devices were developed for application to laminar flow, or the particular problem of thermal gradients at the boundary. They are normally deployed in turbulent flow conditions, for the purposes described above, or some-times for mixing. As such they are deficient in addressing the particular problem at hand. Tube bundle and vane conditioners are not designed to mix the flow or disturb the boundary layer, and hence have little impact on the thermal boundary layer as it passes through. In the case of plate and tab-type conditioners, although these can be used for mixing in turbulent flow conditions, they are ineffective at solving the problem of thermal gradients at the boundary in laminar flows. This is because (1) there are areas where the boundary layer flow can pass through relatively unaffected, and (2) in laminar flows when the boundary layer becomes separated from the wall, it tends to reattach in such a way that the thermal gradient is largely preserved.

This can be illustrated with reference to a tab-type conditioner. A conventional tab-type conditioner has a group of four tabs at each of a number of locations spaced along the axis of the conduit as illustrated in FIGS. 3a and 3b. Looking down the conduit, the tabs 1 from each group are aligned with one another as shown in FIG. 3a. Therefore, in the zones 2 between the tabs, the boundary layer at the wall can pass through undisturbed, as shown in FIG. 3a. Furthermore, when the laminar boundary layer 3 is forced off the wall by the presence of a tab, it reattaches downstream, creating a recirculation zone or dead zone 4 behind the tab. This is illustrated in FIG. 4 for a single tab in two-dimensional form. The fluid trapped in the zone behind the tab will take on the temperature of the boundary layer 3 and hence a thermal gradient will still be present in the reattached boundary layer 5.

Another related field is the mixing of two fluids or the homogenization of a single fluid in a conduit, the latter including application to temperature redistribution in heat exchangers. In laminar flow conditions, static mixers are known that are made up of arrays of planar or curved blades. These blades are combined in assemblies, with blades arranged alternatively in two or more planes, these planes typically being at 45° to the conduit axis and 90° to one another, as illustrated in FIGS. 5a and 5b. Additional planes of blades are often included in a single assembly as illustrated in FIG. 6. In a single assembly, all of the blades are parallel with respect to one another (e.g. horizontal or vertical). For more effective mixing, this type of mixer may be comprised of several sub-assemblies with the blades of one subassembly at a different angle to another subassembly as shown in FIGS. 7a and 7b. It is characteristic of these mixers that the blades extend completely across the conduit and when viewed looking down the axis of the conduit, they leave no unobstructed area for straight-through passage of laminar flow (e.g. FIG. 5a).

BRIEF SUMMARY OF THE INVENTION

The invention described in this document is used to alter the flow conditions in a conduit such that an ultrasonic flow meter can perform more accurately in the laminar flow regime. The flow is conditioned by displacing and mixing the fluid at the periphery of the conduit such that a thermal gradient that exists directly next to the wall of the conduit is substantially eliminated. This in turn results in a more consistent relationship between the ultrasonic transit times measured by the flowmeter and actual rate of flow.

BRIEF DESCRIPTION OF THE SEVERAL VIEWS OF THE DRAWING

In the accompanying drawings, the preferred embodiment of the invention and preferred methods of practicing the invention are illustrated in which:

FIGS. 3A and 3B show a prior art tab type conditioner.
FIG. 4 shows a single tab and its effect on a laminar boundary layer in fluid flow.
FIGS. 7A and 7B show a static mixer of the prior art with several subassemblies with the blades of one subassembly in a different angle to another subassembly.
FIGS. 8A, 8B, 8C and 8D show the effect of ramps on the boundary layer of fluid flow.

DETAILED DESCRIPTION OF THE INVENTION

Figure 1A:
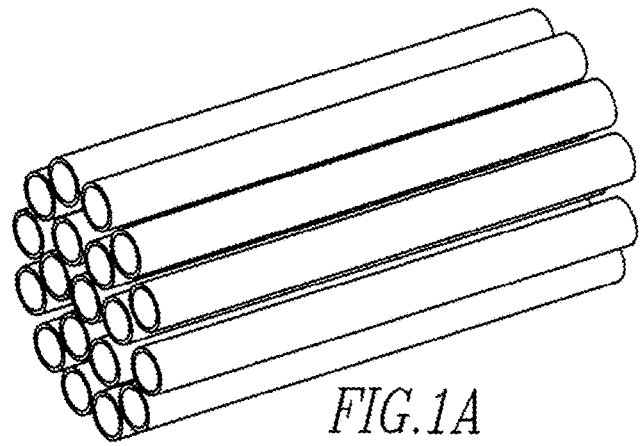
FIG. 1A shows a prior art tube bundle.
Figure 1B:
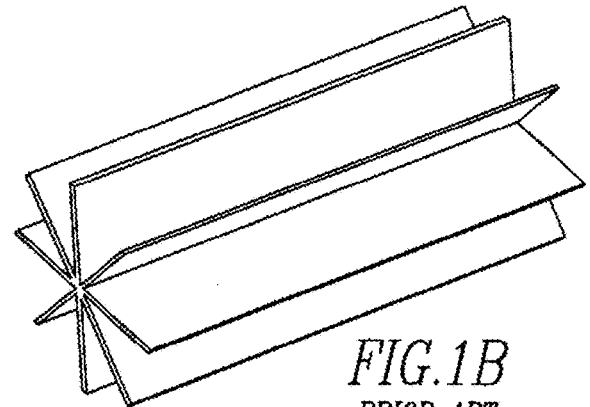
FIG. 1B shows a prior art vane straightener.
Figure 2:
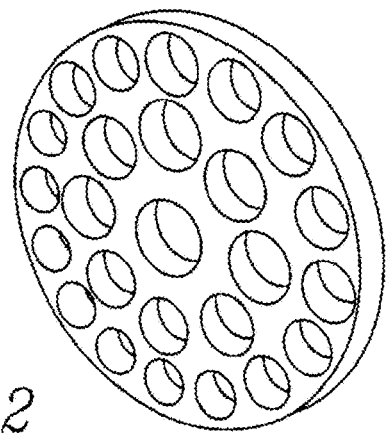
FIG. 2 shows a prior art perforated plate conditioner.
Figure 5A:
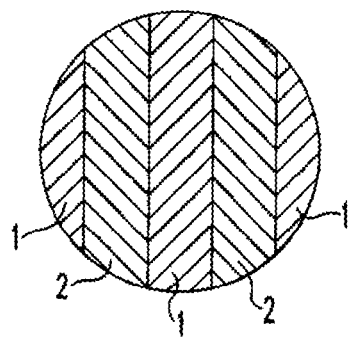
FIGS. 5A and 5B show prior art plates of a static mixer.
Figure 5B:
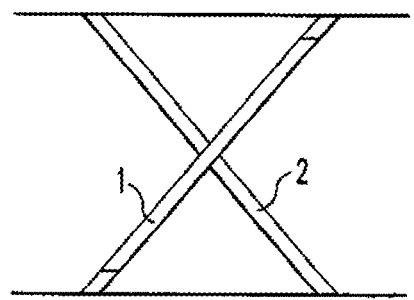
Figure 6:
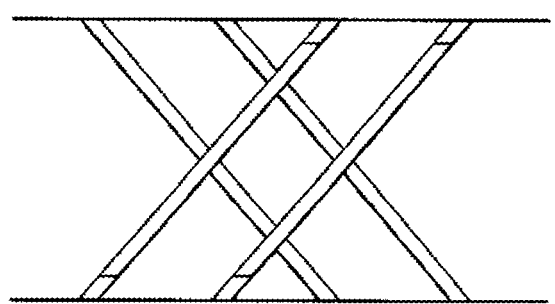
FIG. 6 shows prior art blades of a static mixer with additional blades compared to FIG. 5.
Figure 9:
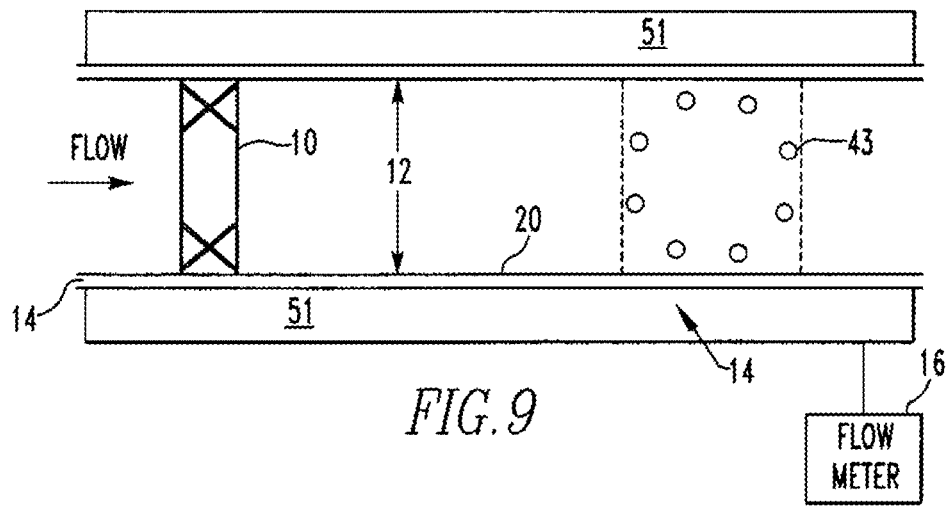
FIG. 9 shows a side view of a cross-section of an apparatus of the present invention.
Figure 13A:
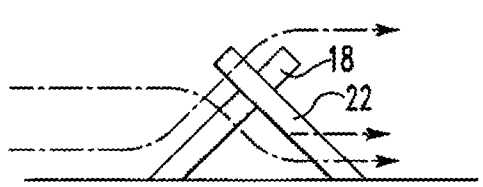
FIGS. 13A and 13B show ramps in juxtaposition to each other in different relationships.
Figure 13B:
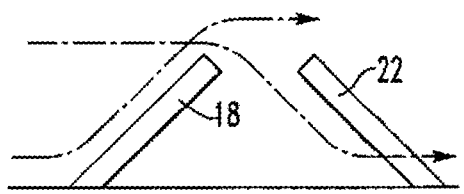

Referring now to the drawings wherein like reference numerals refer to similar or identical parts throughout the several views, and more specifically to FIGS. 9, 13a and 13b thereof, there is shown a flow conditioner 10 for displacing and mixing fluid flow that defines an envelope 12 in a cross sectional direction in a pipe 14. The pipe may have transducer sites or recesses 24 for transducers of an ultrasonic flow meter 16, or the transducers may be external transducers such as used in clamp-on type meters disposed on the outside of the pipe 14, or transducers where the cavity is filled with another material. Alternatively, and more generally, the conditioner may be used with a pipe in applications that do not utilize flow meters.

The conditioner comprises a first ramp 18 adapted to be disposed in the pipe 14 and extending from the outside of the envelope 12 inward toward the center of the pipe 14 in a downstream direction with respect to the fluid flow and forming an angle between 0° and 90° relative to the pipe's inner surface 20. The conditioner comprises a second ramp 22 adapted to be disposed in the pipe 14 and in juxtaposition with the first ramp 18. The second ramp 22 extends from the outside of the envelope 12 inward toward the center of the pipe 14 in an upstream direction with respect to the fluid flow and forms an angle between 0° and 90° relative to the pipe's inner surface 20. The first and second ramps 18, 22 are adapted to be positioned upstream of one of the transducer sites 24, in applications where transducer sites are present.

Figure 22:
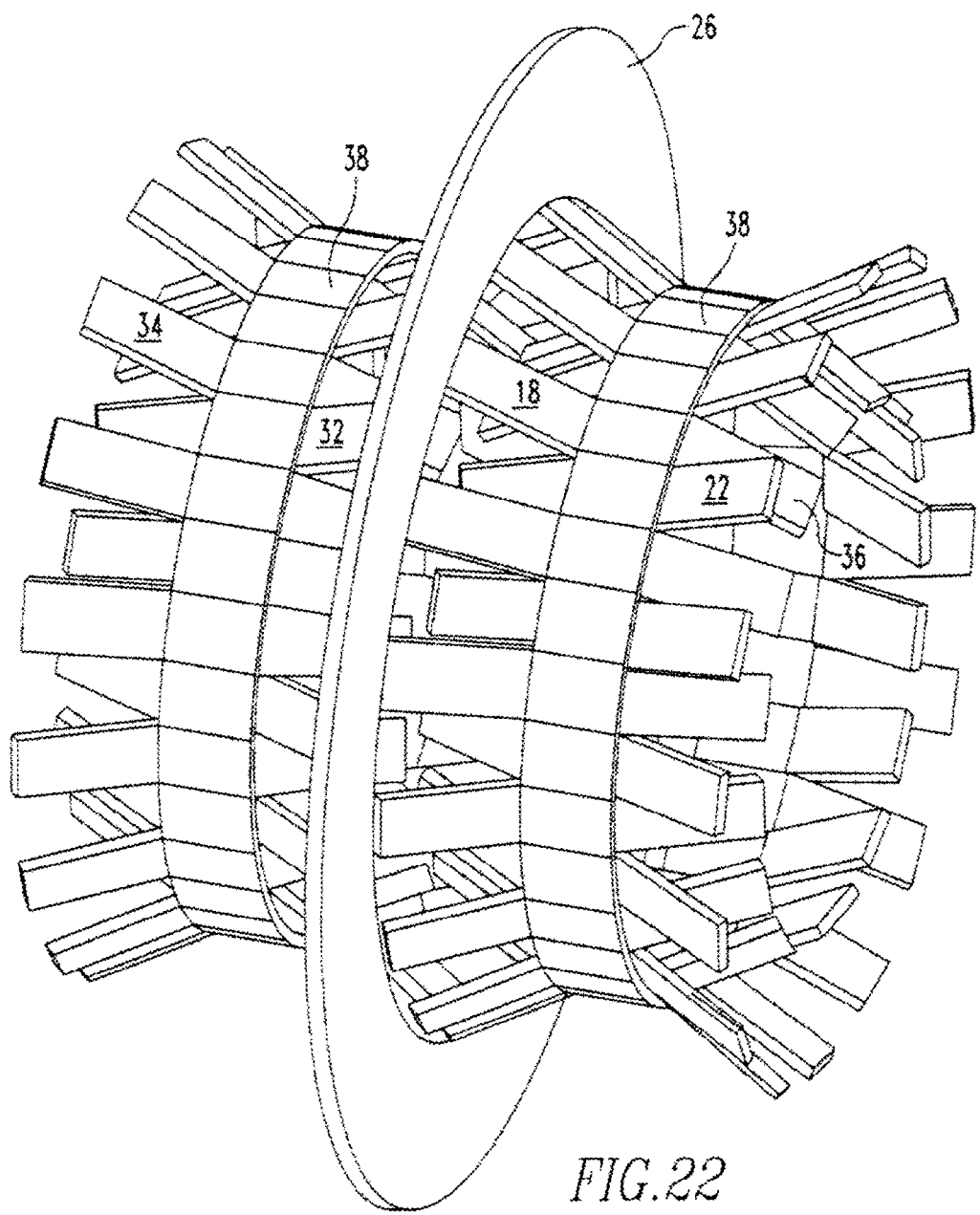
FIG. 22 shows a conditioner of the present invention.
Figure 23:
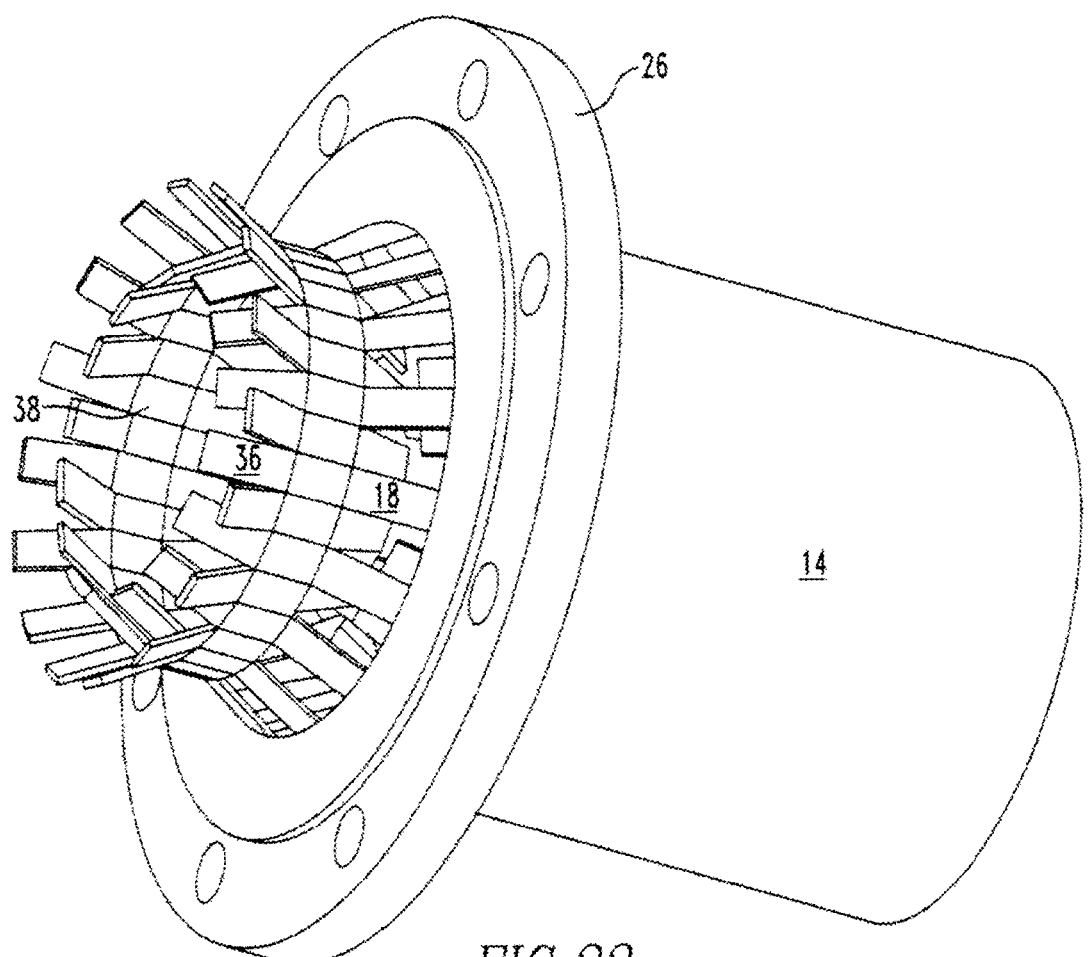
FIG. 23 shows a portion of a pipe with a conditioner of the present invention.

The flow conditioner 10 may include a flange 26, as shown in FIG. 22, having a face 28 which attaches to the pipe 14 and an opening 30 in the face 28 defined by an area through which fluid in the pipe 14 flows. The first and second ramps 18, 22 are attached to and extend from the face 28. The flange 26 is attached to the pipe 14 upstream of the transducer sites 24. The flow conditioner 10 may include a third ramp 32 adapted to be disposed in the pipe 14 and extending from the outside of the envelope 12 inward toward the center of the pipe 14 in a downstream direction with respect to the fluid flow and forming an angle between 0° and 90° relative to the pipe's inner surface 20. The conditioner may include a fourth ramp 34 adapted to be disposed in the pipe 14 and in juxtaposition with the third ramp 32. The fourth ramp 34 extends from the outside of the envelope 12 inward toward the center of the pipe 14 in an upstream direction with respect to the fluid flow and forms an angle between 0° and 90° relative to the pipe's inner surface 20. The third and the fourth ramps 32, 34 are attached to and extending from the face 28. FIG. 23 shows the conditioner positioned in the pipe 14.

The first ramp 18 and the second ramp 22 may be in spaced relationship with the third ramp 32 and the fourth ramp 34, respectively. The flow conditioner 10 may include a strip 38 and a fifth ramp 36 attached to and extending from the strip 38. The first ramp 18 is attached to and extends from the strip 38 with the strip 38 disposed between the first ramp 18 and the fifth ramp 36. The first ramp 18 may be in series with the second ramp 22 and the third ramp 32 may be in series with the fourth ramp 34. The first, second, third and fourth ramps 18, 22, 32, 34 may extend essentially up to a height of about ⅕ of the diameter of the pipe 14 from the inner surface 20 of the pipe 14.

In one embodiment the first ramp 18 is positioned alongside and in parallel with the second ramp 22. In another embodiment, the first, second, third and fourth ramps 18, 22, 32, 34 have a surface 40 exposed to the fluid flow which is flat. In yet another embodiment the first, second, third and fourth ramps 18, 22, 32, 34 have a surface 40 exposed to the fluid flow which is not flat, as shown in FIG. 17a-17f.

With reference to FIGS. 13a, 13b, 14, 15a-15d and 22, the first ramp 18 may have the second ramp 22 directly behind it or offset behind it, for instance offset the distance of about the width of the ramp to the side. Additional ramps may be positioned in parallel with the first ramp 18 and with the second ramp 22 in alternating fashion so there is a space of about the width of the ramp between ramps next to each other, with the series of ramps behind the first set of ramps aligned with the spaces between the first set of ramps, as shown in FIG. 22. The first set of ramps may extend upwards from the inner surface of the pipe 14 or the flange 26 with the second set of ramps extending downward to the inner surface of the pipe 14 or flange 26, with the first set of ramps essentially forming the upward slope of a hill and the second set of ramps forming the downward slope of the hill in regard to the direction of flow. The second ramp 22 may extend continuously from the first ramp 18, have a strip 38 between them, or have a space of from about one to two inches to about 1, 2, 4 or even 6 feet depending on the boundary conditions and flow.

The present invention pertains to an apparatus 11 for determining fluid flow in a pipe 14. As mentioned above the pipe has transducer sites that may or may not have transducer recesses 24. The apparatus 11 comprises an ultrasonic flow meter 16 having transducers that communicate with the fluid flow in the pipe 14. In an embodiment where there are transducer recesses 24 present, the transducers communicate with the fluid flow through the transducer recesses 24. The apparatus 11 comprises a flow conditioner 10 for displacing and mixing the fluid flow that defines an envelope 12 in a cross-sectional direction having a first ramp 18 disposed in the pipe 14 and extending from the outside of the envelope 12 inward toward the center of the pipe 14 in a downstream direction with respect to the fluid flow and forming an angle between 0° and 90° relative to the pipe's inner surface 20. The flow conditioner 10 has a second ramp 22 adapted to be disposed in the pipe 14 and in juxtaposition with the first ramp 18. The second ramp 22 extends from the outside of the envelope 12 inward toward the center of the pipe 14 in an upstream direction with respect to the fluid flow and forms an angle between 0° and 90° relative to the pipe's inner surface 20.

In an embodiment where transducer sites are present, the first and second ramps 18, 22 are adapted to be positioned upstream of one of the transducer sites 24. The flow conditioner 10 would typically be disposed a distance between 5 and 15 diameters of the pipe 14 upstream from the transducer sites 24, although the distance may be longer or shorter than between 5 and 15 diameters of the pipe 14, depending on the circumstances.

The present invention pertains to a method for determining fluid flow in a pipe 14. The pipe 14 may have a plurality of transducer sites 24. The method comprises the steps of displacing a thermal boundary layer in the fluid flow in proximity to the pipe's inner surface 20 with a first ramp 18 extending at an angle between 0° and 90° from the pipe's inner surface 20. In an embodiment where transducer sites are present, the first ramp 18 is disposed upstream from one transducer site of the plurality of transducer sites 24. There is the step of sending an ultrasonic signal from the transducer of an ultrasonic flow meter 16 into the fluid flow. If transducer recesses 14 are present, the transducer communicates with the fluid flow through the one recess. There is the step of displacing the thermal boundary layer in the fluid flow in proximity to the pipe's inner surface with a second ramp extending at an angle between 0° and 90° from the pipe's inner surface and in juxtaposition with the first ramp. There is the step of calculating the flow from the signal with the flow meter 16. There may be the step of displacing the thermal boundary layer with a second ramp 22 extending at an angle between 0° and 90° from the pipe's inner surface 20 and disposed in juxtaposition with the first ramp 18 and upstream of the transducer site.

The present invention pertains to a method for determining fluid flow in a pipe 14. The method comprises the steps of displacing a thermal boundary layer in the fluid flow in proximity to the pipe's inner surface 20 with a first ramp 18 extending at an angle between 0° and 90° from the pipe's inner surface 20. There is the step of displacing the thermal boundary layer with a second ramp 22 extending at an angle between 0° and 90° from the pipe's inner surface 20 and disposed in juxtaposition with the first ramp 18. Essentially, the first ramp 18 could be considered as pushing the fluid out from the inner surface 20 of the pipe 14 and the second ramp 22 pushing the fluid in towards the inner surface 20 of the pipe.

In the operation of the invention, the present invention is directed to a flow conditioning device, designed to improve the performance of ultrasonic flowmeters in laminar flow conditions. The device conditions the flow stream with an assembly of ramps designed to create radial movement to displace and mix the fluid at the wall of the conduit. Relative to the direction of flow through the conduit, the ramps slope either in towards the centre of the conduit, or out towards the wall of the conduit. The inward sloping ramps force the fluid in the boundary layer in towards the centre of the pipe 14, whereas the outward sloping ramps force fluid towards the wall to displace and mix with the boundary layer, as illustrated in FIGS. 8a, 8b, 8c and 8d.

The method of use involves placing the conditioner in a conduit upstream of the flow meter 16 to displace and partially mix the flow in the boundary layer. The distance between the conditioner and the flow meter 16 is long enough to reduce the hydraulic disturbance observed at the location of the flowmeter, but short enough to ensure that significant thermal gradients are not reestablished at the pipe wall in the intervening section of conduit. The conduit surrounding the conditioner, the flow meter 16 itself, and the connecting conduit between the conditioner and the flowmeter would preferably be insulated such that heat transfer between the outside and the contents of the pipe 14 is minimized. An illustration of the method of use is shown in FIG. 9. If desired, thermal insulation 51 may be utilized.

Figure 10A:
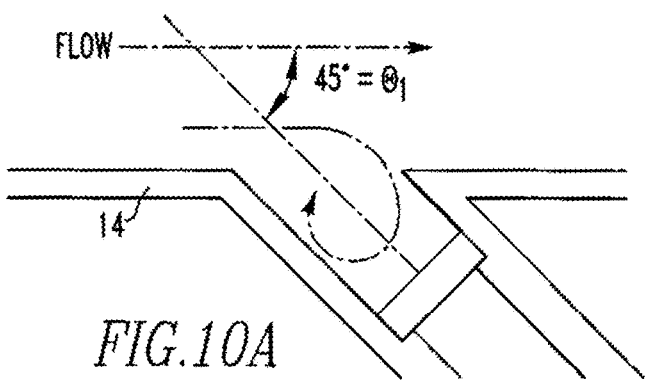
FIGS. 10A, 10B, 10C show a transducer housing for transmitting ultrasound into a fluid.
Figure 10B:
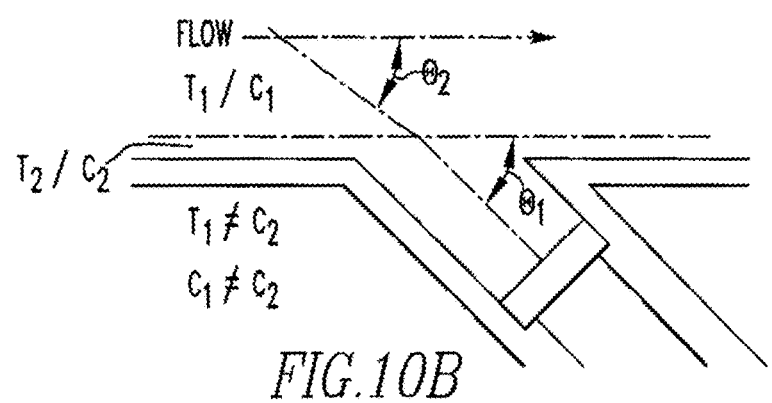
Figure 10C:
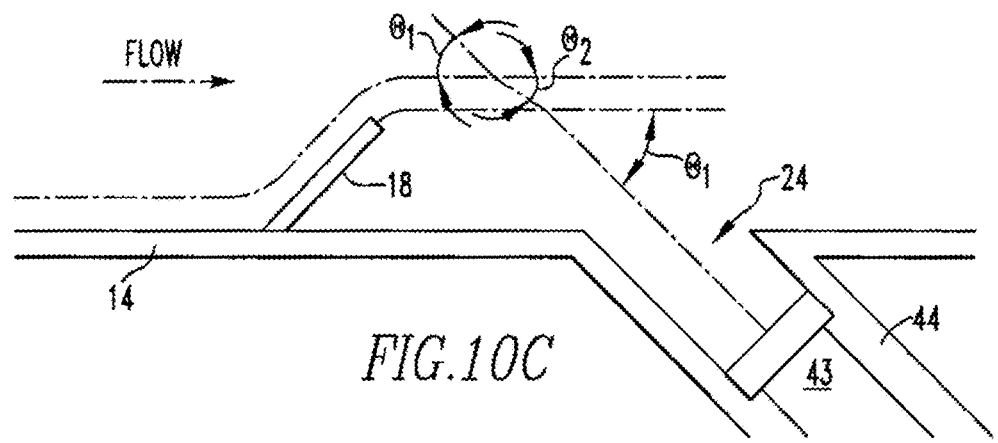

FIGS. 10a, 10b and 10c represent a transducer housing for transmitting ultrasound into a fluid as part of an ultrasonic flowmeter. The representation here is in two dimensions only. In reality the three dimensional geometry is generally more complex, involving a cylindrical conduit wall and cylindrical transducer housing. However, the simplified two-dimensional case serves well to illustrate the nature of the problem. In FIG. 10a, the temperature of the fluid is homogenous, and the ultrasound travels in a direction that is perpendicular to the face 28 of the transducer housing. In FIG. 10b, the pipe wall is hotter or colder than the fluid in the centre of the conduit. Therefore there is a layer of fluid next to the pipe wall that has a higher or lower temperature than the fluid at the centre of the pipe 14. This in turn results in the fluid in the cavity in front of the transducer being at the same temperature as the layer of fluid next to the pipe wall. Consequentially, the velocity of sound along the path of travel of the ultrasound is not constant and the ultrasound will undergo refraction, causing a change in path angle. This can be illustrated further by example. In reality the change in sound velocity would be continuous but here for the sake of simplicity it can be assumed an abrupt change in sound velocity occurs at a short distance from the pipe wall as this serves to illustrate the principles at work. Assume that the ultrasound leaves the transducer housing at an angle of 45° to the axis of the conduit, that the sound velocity of the fluid in the cavity is 1470 m/s and the sound velocity of the fluid in the centre of the conduit is 1463 m/s. This would correspond to a difference of approximately 2° C. in fluid temperature. From Snell's law we can calculate that the angle with respect to the pipe 14 axis will change to approximately 45.27°. This change in angle is significant in terms of high accuracy ultrasonic transit time flow measurement.

Now consider the case where the thermal boundary layer is displaced from the wall by means of a ramp. If the layer of fluid that is at a different temperature from the core is prevented from reattaching to the wall, as illustrated in FIG. 10c, then the transfer of heat between that layer and the rest of the fluid will be increased. Furthermore, the detachment of the layer from the wall allows the fluid in the cavity to retain the same temperature as the fluid in the centre of the conduit. Therefore, even if there is a thin layer of fluid of different temperature present in the stream, when it the ultrasound crosses the layer refraction occurs twice, and the angle of travel is only changed within the layer, as illustrated in FIG. 10c.

Figure 11A:
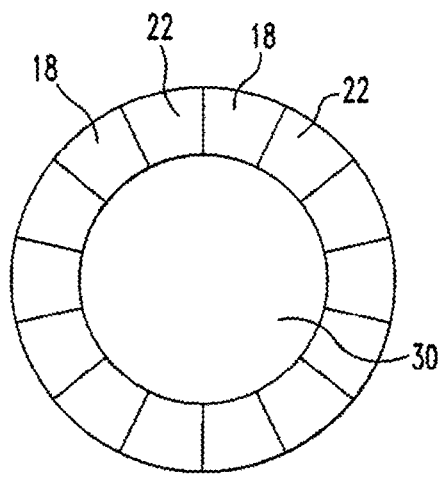
FIGS. 11A and 11B show ramps forming different configurations.
Figure 11B:
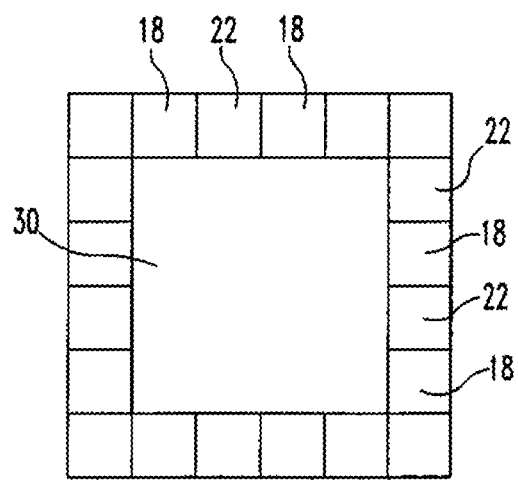

The above description shows that it is not necessary for the conditioner to completely homogenize the temperature distribution, it is sufficient to displace the boundary layer close to the wall. This means that ramp elements used in the invention do not need to extend to the centre of the pipe 14, and would typically be no more than one fifth of the conduit width in height, as illustrated in FIGS. 11a and 11b. As the elements do not block the central passage of the conduit, this leads to less pressure loss when compared with laminar flow mixers that are designed for the separate purpose of mixing the entire cross-section of the flow. This aspect of the invention is particularly advantageous when the application conditions span a wide range of flowrate and/or Reynolds number.

Figure 12:
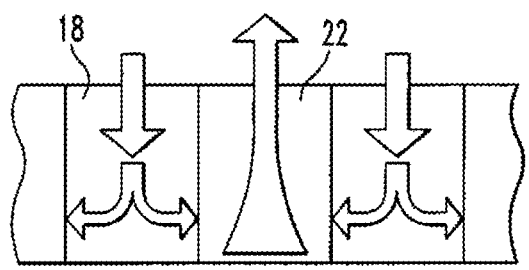
FIG. 12 shows the effects of an outward sloping ramp and an inward sloping ramp on the fluid flow.

In order that boundary layer reattachment is prevented from occurring as described above and presented in FIG. 10c, it is necessary that inward and outward sloping ramps are deployed in combination. When deployed in this fashion, the fluid displaced towards the pipe wall by the outward sloping ramp is then channeled to the rear side of the inward sloping ramp as illustrated in FIG. 12, where the flow is into the page. This requires either deploying the ramps overlapping as illustrated in FIG. 13a or with the inward sloping ramps placed a short distance upstream of the outward sloping ramps as illustrated in FIG. 13b. In addition to the intended displacement of the fluid from the boundary layer, this configuration of ramps will also partially mix the fluid by inducing turning motions in the flow.

Figure 14:
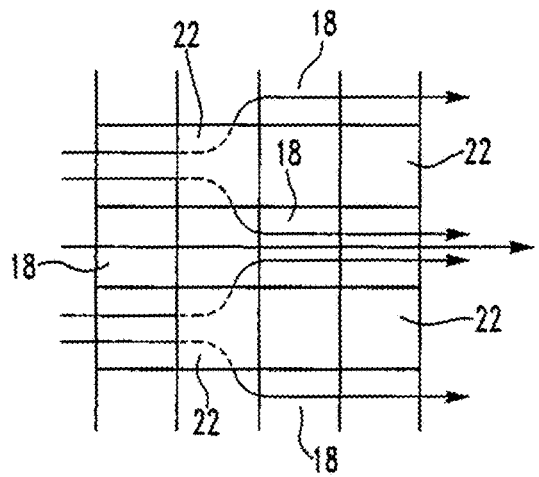
FIG. 14 shows a first array of ramps and a second array of ramps downstream of the first array of ramps.

In some situations one array of alternating inward and outward sloping ramps may suffice. However, in other situations, such as creeping flow at very low Reynolds numbers in the laminar regime, it will be advantageous to have additional arrays of ramps placed downstream of the first array. Additional arrays can be advantageously positioned such that a second array of inward sloping ramps is positioned downstream of the first array of inward sloping ramps, such that the fluid that is displaced towards the pipe wall by the first array of outward sloping ramps is then displaced outwards by the second array. This arrangement is illustrated in FIG. 14. The width and angle of the ramps may be varied within the scope of the invention.

Figure 15A:
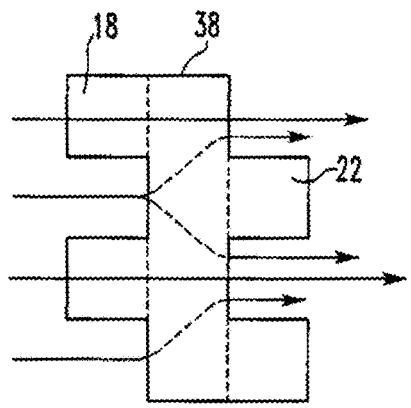
FIGS. 15A, 15B, 15C and 15D show ramps extending up and down from a shared plateau.
Figure 15B:
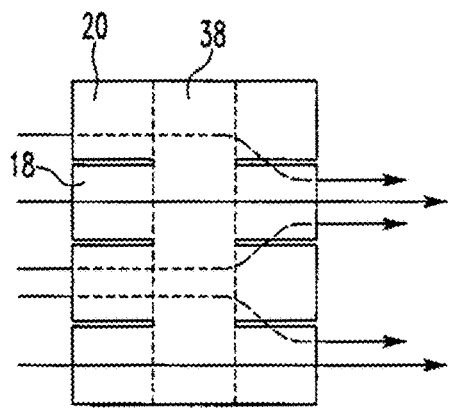
Figure 15C:
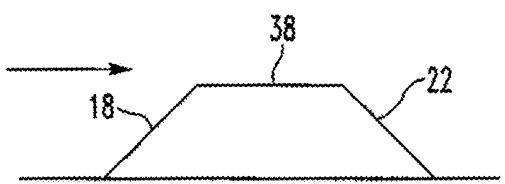
Figure 15D:
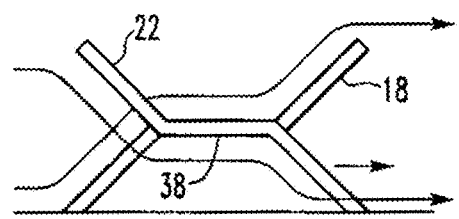
Figure 16A:
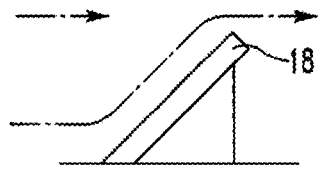
FIGS. 16A, 16B and 16C show ramps that are supported by a central brace.
Figure 16B:
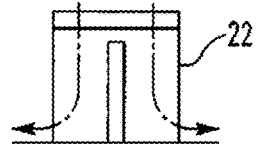
Figure 16C:
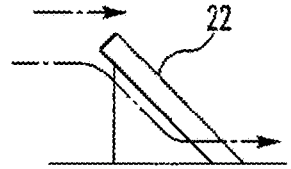
Figure 17A:
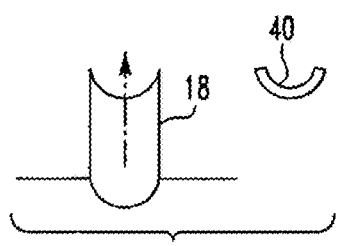
FIGS. 17A, 17B, 17C, 17D, 17E and 17F show ramps of different cross-sections.
Figure 17C:
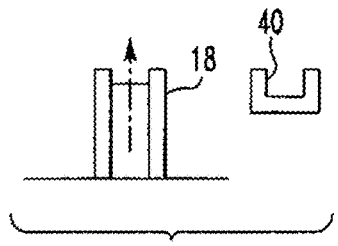
Figure 17E:
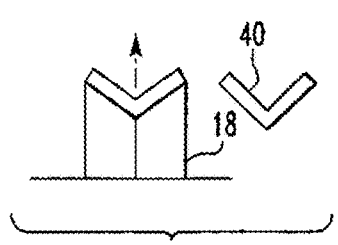
Figure 17B:
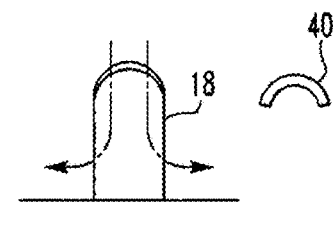
Figure 17D:
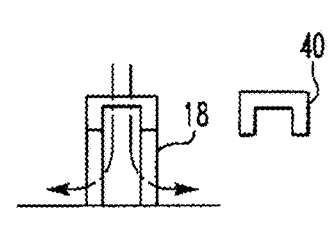
Figure 17F:
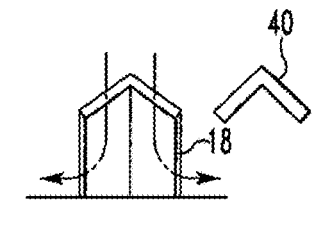

In addition to the simple versions shown in FIGS. 13a and 13b, the ramps may be constructed differently to achieve the same end. Examples include ramps extending up and down from a shared plateau such as shown FIGS. 15a, 15b, 15c and 15d or ramps that are supported by a central brace as shown in FIGS. 16a, 16b and 15c. Furthermore, the cross-section of the ramps could be in the form of a rectangular, v-shaped or curved channel, as illustrated in FIG. 17a-17f.

Figure 18:
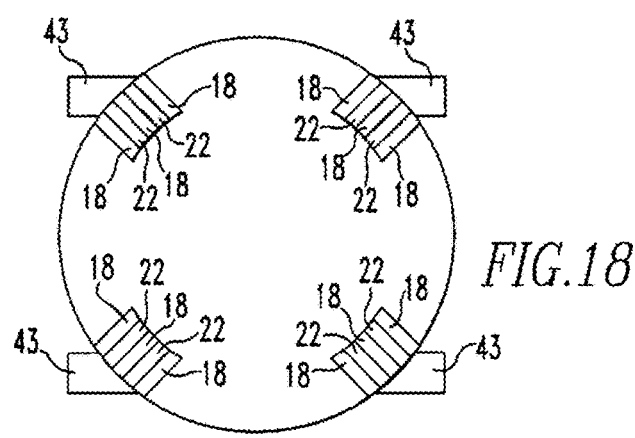
FIG. 18 shows ramps at multiple locations along a pipe's periphery.

In order for the conditioner to be effective, it should disrupt the boundary layer upstream of each of the transducer sites. Most high-accuracy transit time ultrasonic flowmeters are multipath devices with transducers at multiple locations on the periphery of the conduit, as illustrated in FIG. 18. Therefore ramps may be required at multiple locations. In practice however, it may be more convenient to have the ramps in a continuous array as illustrated in FIG. 11.

Figure 19:
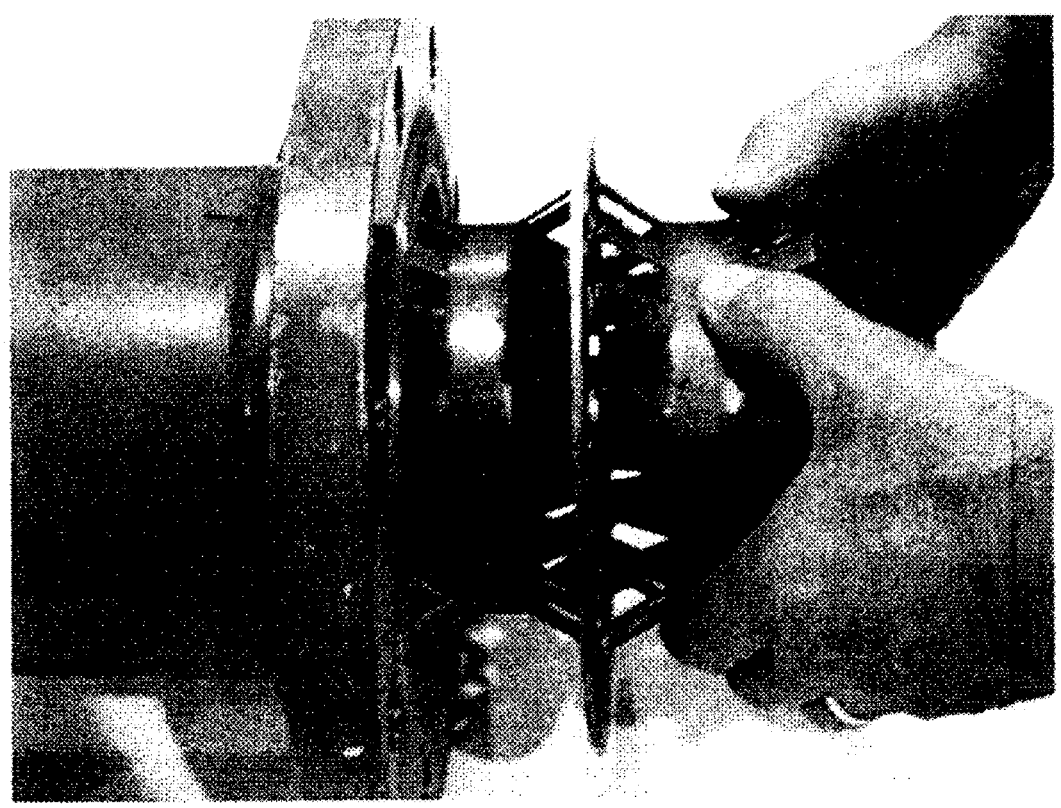
FIG. 19 shows a photograph of a conditioner of the present invention.
Figure 20:
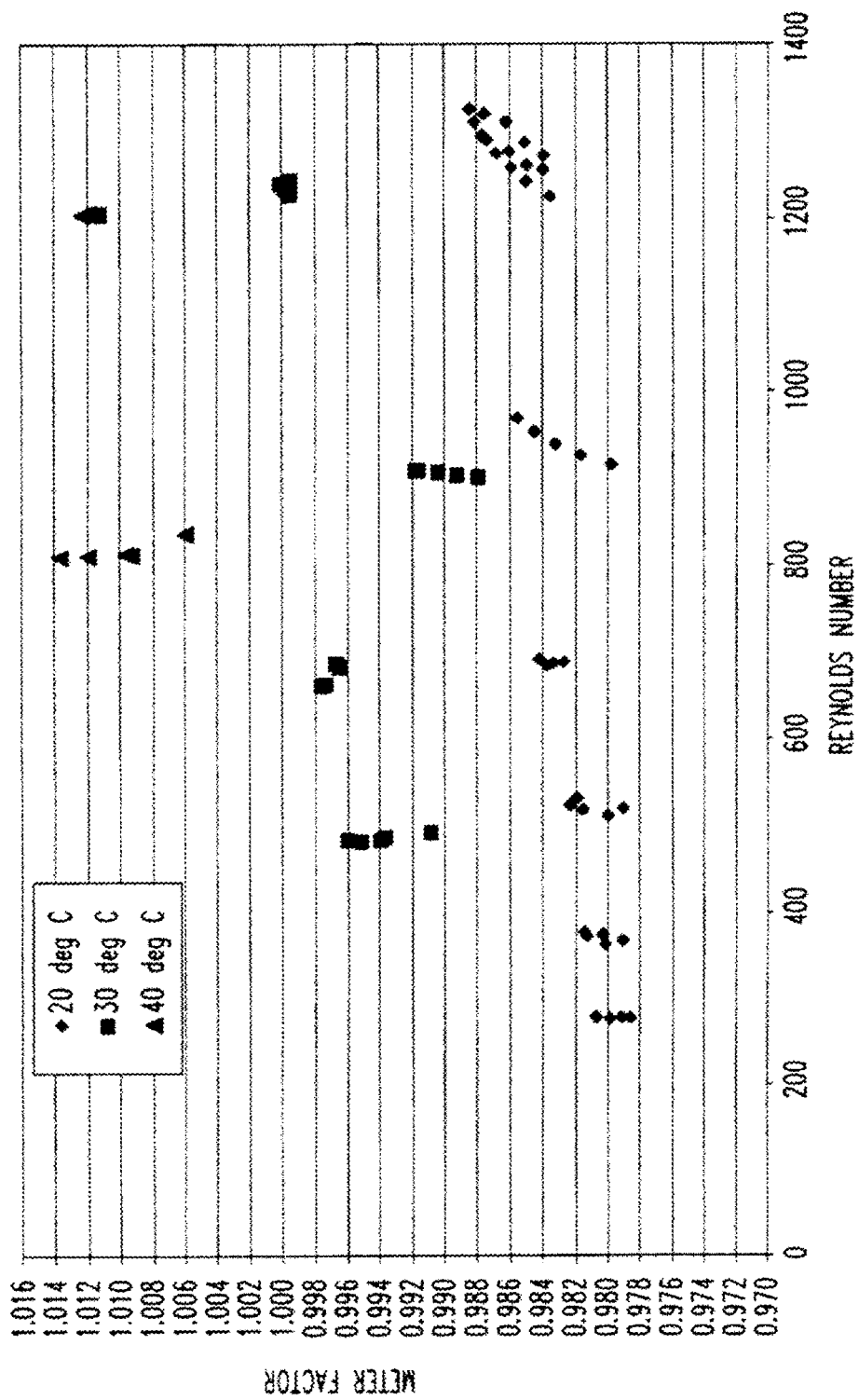
FIG. 20 is a graph showing meter factor as a function of Reynolds number and temperature without the conditioner of the present invention.
Figure 21:
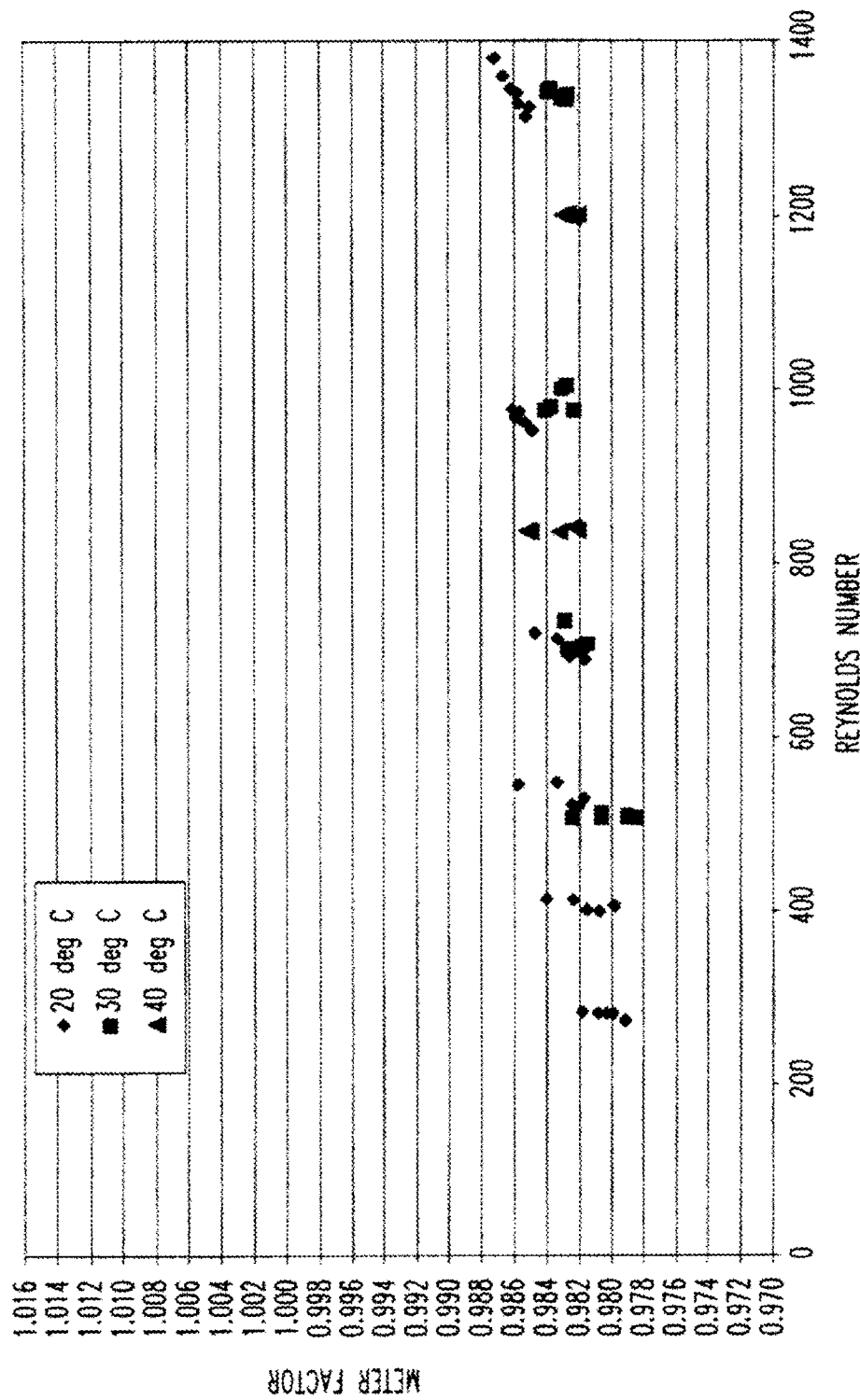
FIG. 21 is a graph showing meter factor as a function of Reynolds number and temperature with the conditioner of the present invention.

FIG. 19 shows a photograph of a boundary layer flow conditioner 10 that was constructed for experimental validation of the conditioner and method. A control experiment was first performed using an ultrasonic flowmeter with no flow conditioner 10 disposed upstream. Tests were carried out in the laminar regime with oil temperatures of 20, 30 and 40° C., and ambient temperature of around 20° C. As shown in FIG. 20, the meter factor, which is the ratio between the indicated and actual flowrates, is strongly dependent on temperature when no flow conditioning device is used. 150 mm glass mineral wool insulation 51 was wrapped around the end of the pipe where the conditioner was placed, the length of pipe between the conditioner and flowmeter, and around the flowmeter itself. The conditioner was placed approximately 10 the pipe diameters upstream of the transducer sites. A second set of tests were then conducted, again in the laminar regime, with similar temperature conditions as before. As shown in FIG. 21, it is apparent that the sensitivity of the meter factor to oil temperature is dramatically reduced when the conditioner is used.

In an example, a 6" pipe 14 and meter were used. The conditioner consisted of two arrays of ramps welded on to each side of a flange 26 ring as shown in FIG. 26. The flange 26 ring was cut from a plate of ⅛" thick steel with an outside diameter equal to the raised face 28 outside diameter of a 6" pipe flange (8.5") and an inside diameter of about 6 1/16". The ramp arrays were made from thin wall (approx. 1/16" thick) 5" diameter steel tubing that were each cut to a length of 2¾" and slotted on each end with 32 equally spaced longitudinal cuts, with a kerf of approx. 1/16" resulting in 32 tabs, ½" wide by 1" long. These tabs were then bent at the roots inward and outward at angles of about 30° to the axis of the tube to form the ramps, resulting in an outside diameter about the same as the inside of the 6" pipe 14 and an inside diameter of about 3¾". One of the ramp arrays was then welded to one side of the flange 26 ring and the other ramp array was welded to the other side such that there are two ramps of the same type in series with respect to the direction of flow.

A minimum of two transducers should be used for transit time measurement. Both of these could be on the same side of the pipe 14 (same part of the circumference) but displaced from one another down the axis. In that case the ramps would have to cover only one location on the circumference upstream of the transducers. If many transducers are used, with transducer sites 24 at different locations around the pipe 14, then it is more practical to have a conditioner that extends around the entire periphery of the pipe 14, rather than just at specific locations. A minimum of two ramps should be positioned upstream for a single transducer site (one pushing fluid away from the wall, and the other towards). In practice, one pushing fluid away from the wall and one on either side of that pushing fluid toward the wall would be more effective (produces an effect that is symmetrical about the centre of the ramp assembly).

In order for the ramps to serve their purpose of moving fluid out from or in towards the wall, the angles of the ramps would typically lie between 15 and 75 degrees. Regarding the distance (or 'height') that the ramps extend from the pipe 14 wall, it should be around 0.16 pipe 14 diameters or less depending on the flow conditions (not the length of the tabs, but the 'height' into the flow; see FIG. 12). A limit of 0.2 pipe diameter (or 0.2 times the maximum internal dimension for a non-round conduit) would suffice in most applications.

Regarding the length of the ramps, this is governed by their angle and the distance they extend from the wall. So for example, a ramp that is at an angle of 30 degrees to the wall and is to extend 0.2 diameters in towards the centre of the pipe 14 would be 0.4 diameters long (In one example, for a 6-inch pipe, each 'ramp' is made up of two tabs extending from the tube, about 1 inch long on either side).

With regard to the width of the ramps, they should be sufficiently wide so that their main action is to displace fluid radially, rather than having it 'spill' over the sides. In one example, for a 6-inch pipe, the ramps are about ½ an inch wide, equating to approximately 0.1 D. Making them less than say 0.05 D wide would result in approx 64 ramps round the circumference, and the ramps are becoming rather narrow. So a practical minimum width constraint could be stated as 0.05 times the maximum internal dimension (diameter, length of one side) of the conduit. At the other end of the scale, a width of 0.4 D would result in 8 ramps around the circumference. These represent practical guidelines, not absolute limits.

In general, the conditioner may be made by constructing an array of ramps from a tubular or flat piece of metal, though, it could be made from a different material such as plastic and still achieve the same end. It is also possible that it could be made by joining individual flat ramps together, say by welding.

The conditioner may be used by being sandwiched between pipe flanges. In another variant the ramps could be secured in the upstream section of an integrated flow conditioner and flow meter. Another variant would be a pipe spool with the ramps secured inside the spool.

The conditioner may be incorporated into the meter body, so when the meter is positioned with the pipe, the conditioner is already part of the meter assembly. The meter may be a reduced bore meter, such as described in U.S. Pat. No. 7,810,401, incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A flow conditioner for displacing and mixing fluid flow that defines an envelope in a cross sectional direction in a pipe having transducer sites of an ultrasonic flow meter comprising:
   a first portion adapted to be disposed in the pipe which displaces a thermal boundary layer from the pipewall; and
   a second portion adapted to be disposed in the pipe and in juxtaposition with the first portion, the second portion prevents the thermal boundary layer from reattaching to the pipewall, the first and second portions adapted to be positioned upstream of one of the transducer sites, the first and second portions extend part ways up from the inner surface of the pipe so there is a clear unobstructed area for the fluid to flow through about the pipe's center.

2. The flow conditioner as described in claim 1 including a flange having a face which attaches to the pipe and an opening in the face defined by an area through which fluid in the pipe flows, the first and second portions attached to and extending from the face, the flange attached to the pipe upstream of the transducer sites.

3. The flow conditioner as described in claim 1 including a third portion adapted to be disposed in the pipe and a fourth portion adapted to be disposed in the pipe and in juxtaposition with the third portion.

4. The flow conditioner as described in claim 3 wherein the first portion and the second portion are in spaced relationship with the third portion and the fourth portion, respectively.

5. The flow conditioner as described in claim 4 including a strip and a fifth portion attached to and extending from the strip, the first portion attached to and extending from the strip with the strip disposed between the first portion and the fifth portion.

6. The flow conditioner as described in claim 4 wherein the first portion is in series with the second portion and the third portion is in series with the fourth portion.

7. The flow conditioner as described in claim 4 wherein the first, second, third and fourth portions extend essentially up to a height of about $\frac{1}{5}$ of the diameter of the pipe from the inner surface of the pipe.

8. The flow conditioner as described in claim 4 wherein the first portion is positioned alongside and in parallel with the second portion.

9. The flow conditioner as described in claim 4 wherein the first, second, third and fourth portions have a surface exposed to the fluid flow which is flat.

10. The flow conditioner as described in claim 4 wherein the first, second, third and fourth portions have a surface exposed to the fluid flow which is not flat.

11. An apparatus for determining fluid flow in a pipe having transducer sites comprising:
    an ultrasonic flow meter having transducers that communicate with the fluid flow in the pipe; and
    a first portion adapted to be disposed in the pipe which displaces a thermal boundary layer from the pipewall; and a second portion adapted to be disposed in the pipe and in juxtaposition with the first portion, the second portion prevents the thermal boundary layer from reattaching to the pipewall, the first and second portions adapted to be positioned upstream of one of the transducer sites, the first and second portions extend part ways up from the inner surface of the pipe so there is a clear unobstructed area for the fluid to flow through about the pipe's center.

12. The apparatus as described in claim 11 wherein the flow conditioner is disposed a distance between 5 and 15 diameters of the pipe upstream from the transducer sites.

13. A method for determining fluid flow in a pipe having a plurality of transducer sites comprising the steps of:
    displacing a thermal boundary layer in the fluid flow in proximity to the pipe's inner surface with a first portion and disposed upstream from one transducer site of the plurality of transducer sites;
    preventing the thermal boundary layer with a second portion from reattaching to the pipe's inner surface disposed in juxtaposition with the first portion and upstream of the one transducer site, the first and second portions extend part ways up from the inner surface of the pipe so there is a clear unobstructed area for the fluid to flow through about the pipe's center;
    sending an ultrasonic signal from a transducer of an ultrasonic flow meter into the fluid flow; and
    calculating the flow from the signal with the flow meter.

14. A flow conditioner for displacing and mixing fluid flow that defines an envelope in a cross sectional direction in a pipe having transducer sites of an ultrasonic flow meter comprising:
    a plurality of portions adapted to be disposed in the pipe and extending inward toward the center of the pipe in a downstream direction with respect to the fluid flow which displaces a thermal boundary layer from the pipe's inner surface, the plurality of portions adapted to be positioned upstream of one of the transducer sites, the plurality of portions extend part ways up from the inner surface of the pipe so there is a clear unobstructed area for the fluid to flow through between the portions about the pipe's center.

15. The flow conditioner as described in claim 1 including a flange having a face which attaches to the pipe and an opening in the face defined by an area through which fluid in the pipe flows, the plurality of portions attached to and extending from the face, the flange attached to the pipe upstream of the transducer sites.

* * * * *